United States Patent
Scheffler

(10) Patent No.: US 7,778,000 B2
(45) Date of Patent: Aug. 17, 2010

(54) MEASURE FOR INCREASING THE SHORT-CIRCUIT RESISTANCE OF A DEVICE BY INTRODUCING PARALLEL CURRENT PATHS

(75) Inventor: Sebastian Scheffler, Hamburg (DE)

(73) Assignee: Airbrush Deutschland GmbH (DE)

( * ) Notice: Subject to any disclaimer, the term of this patent is extended or adjusted under 35 U.S.C. 154(b) by 330 days.

(21) Appl. No.: 11/366,948

(22) Filed: Mar. 2, 2006

(65) Prior Publication Data
US 2006/0209482 A1 Sep. 21, 2006

Related U.S. Application Data

(60) Provisional application No. 60/658,320, filed on Mar. 3, 2005.

(30) Foreign Application Priority Data
Mar. 3, 2005 (DE) .................. 10 2005 009 789

(51) Int. Cl.
*H02H 3/20* (2006.01)
*H02H 9/04* (2006.01)
*H02H 9/00* (2006.01)
*H02H 1/00* (2006.01)
*H02H 1/04* (2006.01)
*H02H 3/22* (2006.01)
*H02H 9/06* (2006.01)
*H01C 7/12* (2006.01)

(52) U.S. Cl. ................. 361/91.1; 361/56; 361/58; 361/117; 361/118

(58) Field of Classification Search .............. 361/91.1
See application file for complete search history.

(56) References Cited

U.S. PATENT DOCUMENTS

| 5,745,322 | A | * | 4/1998 | Duffy et al. ............... 361/45 |
| 5,764,464 | A | * | 6/1998 | Botker et al. ............. 361/56 |
| 5,768,342 | A | | 6/1998 | Moore, III |
| 5,796,568 | A | | 8/1998 | Baiatu |
| 5,815,387 | A | * | 9/1998 | Aritsuka .................. 363/54 |
| 6,631,065 | B2 | * | 10/2003 | Sugiyama et al. ........ 361/100 |
| 7,061,739 | B2 | * | 6/2006 | Hastreiter et al. ........ 361/93.1 |
| 7,142,398 | B2 | * | 11/2006 | Granstrom et al. ....... 360/323 |
| 7,286,328 | B1 | * | 10/2007 | Sutardja ................... 360/323 |
| 2004/0174648 | A1 | | 9/2004 | Frey et al. |
| 2005/0286195 | A1 | * | 12/2005 | Francis .................... 361/103 |

FOREIGN PATENT DOCUMENTS

| DE | 4110335 | 10/1992 |
| DE | 44 41 279 C1 | 9/1995 |
| DE | 195 14 806 A1 | 11/1995 |
| DE | 19829775 | 1/2000 |
| DE | 101 24 683 A1 | 12/2002 |
| GB | 1449607 | 9/1976 |
| GB | 2336046 | 10/1999 |
| WO | 92/07402 | 4/1992 |

* cited by examiner

*Primary Examiner*—Jared J Fureman
*Assistant Examiner*—Dharti H Patel
(74) *Attorney, Agent, or Firm*—Lerner, David, Littenberg, Krumholz & Mentlik, LLP

(57) ABSTRACT

An overcurrent protection arrangement for aircraft to protect an electric element from an overcurrent, the overcurrent protection arrangement including an overcurrent protection device designed for detecting the overcurrent of a current through the electric element to be protected via the overcurrent protection device in such a way that the current through the element to be protected does not exceed an upper current limit.

17 Claims, 3 Drawing Sheets

US 7,778,000 B2

MEASURE FOR INCREASING THE SHORT-CIRCUIT RESISTANCE OF A DEVICE BY INTRODUCING PARALLEL CURRENT PATHS

CROSS-REFERENCE TO RELATED APPLICATIONS

This application claims the benefit of the filing date of U.S. Provisional Patent Application No. 60/658,320 filed Mar. 3, 2005, the disclosure of which is hereby incorporated herein by reference.

BACKGROUND OF THE INVENTION

The present invention relates to an overcurrent protection arrangement, to a method for protecting an electric element from an overcurrent, and to a means of transportation.

One regulation regarding electronic aircraft components stipulates that the respective terminals be protected from short-circuits. These short-circuit currents can exceed several 100 Ampere and consequently destroy the electric devices in question because this causes said devices to be subjected to a multiple of their normal load. These high overcurrents can be created because the internal resistance of the electric components in aircraft needs to be maintained as low as possible so as to achieve the highest degree of efficiency possible.

Although the high short-circuit currents are shut down within a few milliseconds, each electronic device in the circuit needs to be checked as to its capability to withstand the applied short-circuit currents. A decisive factor in this case is the weakest internal electric component of the electric device. Since the load limit of this weakest component frequently does not suffice for withstanding the short-circuit current, it is possible that the entire device is damaged. Consequently, additional precautions need to be taken in order to lower the overcurrent below the load limit of the weakest component. The costs of these precautions drop as the load limit of the weakest device increases in case of a short-circuit. However, the utilization of more robust devices with a higher load limit is frequently limited by the technology to be used or design specifications, for example, volumetric or weight restrictions.

One known precaution for protecting an electric device is the utilization of a disposable fuse that interrupts the circuit in case of a short-circuit current without creating smoke or fire during a short-circuit. However, the utilization of these fuses should be avoided in aircraft applications because they are difficult to access for being repaired or replaced.

Another approach consists of reducing the overcurrent in the circuit. In a circuit that operates within alternating current, this is usually achieved with a coil. This coil increases the internal resistance of the electric device and thusly limits the intensity of the short-circuit current. However, since the normal load, for example, of heating devices in aircraft may exceed 1.5 kVA, the coil needs to be designed such that it is able to permanently withstand a current intensity of 12 Ampere. In order to also maintain the loss as low as possible, it is necessary to use large wire diameters that, however, result in a high weight, namely because the coils primarily consist of copper and may contain a core of a ferromagnetic metal.

SUMMARY OF THE INVENTION

According to one exemplary embodiment of the invention, an overcurrent protection arrangement for an aircraft is provided that may comprise an electric element to be protected from an overcurrent and/or an overcurrent protection device, wherein the overcurrent protection device is designed for diverting a current through the electric element to be protected via the overcurrent protection device in such a way that the current through the element to be protected does not exceed an upper current limit.

According to another exemplary embodiment of the invention, a method for protecting an electric element in an aircraft from an overcurrent is provided, wherein the current through the electric element to be protected is, according to this method, diverted by the overcurrent protection device in such a way that the current through the element to be protected does not exceed an upper current limit.

According to yet another exemplary embodiment of the invention, a means of transportation is provided, particularly an aircraft, that comprises an overcurrent protection arrangement with the above-described features.

According to an exemplary embodiment of the invention, an inexpensive and light-weight overcurrent protection may be provided.

According to an exemplary embodiment of the invention, an overcurrent applied to the component to be protected can be diverted and consequently reduced such that the load limit of the component to be protected is increased and, for example, the size and the weight of the additional protective measures can be reduced. If the overcurrent protection arrangement is implemented, in particular, in an aircraft, this may make it possible to achieve a reliable, cost-efficient and light-weight protection of electric components and circuits contained in said aircraft from damages caused by a possibly occurring overcurrent. With respect to aircraft, it may be particularly important to achieve a light weight, as well as to ensure a particularly high safety standard.

According to an exemplary embodiment of the invention, an overcurrent protection arrangement comprises the electric component to be protected and a safety device that detects an overcurrent and subsequently diverts the current from the electric component such that the overcurrent applied to the electric component is reduced. The safety device may detect a short-circuit current based on a voltage drop that may be caused by a short-current. The safety device may be connected in parallel to the electric component.

The safety device may have a symmetric and/or a non-linear current/voltage curve. The term symmetric may refer, in particular, to a current/voltage curve that at positive currents causes a corresponding voltage response as at negative currents. A current/voltage curve may be denoted as non-linear, in particular, if no direct proportionality exists between the current and the voltage. A characteristic non-linearity ensures that the overcurrent protection can take place in a relatively abrupt fashion, and that the electric component is essentially not impaired below a threshold value. According to an embodiment of the present invention, a diode circuit, for example, according to FIG. 3 may be provided for this purpose.

One exemplary variation of the safety device comprises an anti-parallel connection of two diodes. The diodes may be silicon, germanium, Schottky, Zener or suppressor diodes. It is also possible to utilize other semiconductor components such as transistors, particularly transistors that are wired as diodes, for example, MOSFETs.

In order to additionally reduce the overcurrent applied to the electric element, it is possible to connect several overcurrent protection devices, in particular, in parallel to the electric component. If one overcurrent protection device fails, the remaining overcurrent protection devices can ensure the overcurrent protection such that the fault liability can be lowered.

According to another embodiment, an impedance is connected in series to the electric component to be protected so as to increase the voltage drop in the component to be protected and thus to improve the triggering of the diversion and/or transfer of the short-circuit current. In this case, the impedance may comprise at least one ohmic resistance and/or at least one coil.

The embodiments of the overcurrent protection arrangement also apply to the method and to the means of transportation, and vice versa.

According to an exemplary embodiment of the invention, it may be made possible to improve the short-circuit capability of an electric device in aircraft by diverting the short-circuit current. Such an overcurrent protection arrangement comprises, for example, an electric component to be protected and a safety element that detects an overcurrent and subsequently diverts and/or takes over and thusly reduces the overcurrent applied to the electric component.

Therefore, embodiments of the invention may make available an arrangement for increasing the short-circuit capability and may simultaneously reduce the weight and the size of the safety elements used. Since an aircraft may comprise more than 100 heating circuits that need to be protected from overcurrents or overvoltages, a slight weight reduction, for example, of 10 g per heating device, may be already significant.

Exemplary embodiments of the invention may be realized, for example, in a hard-wired fashion or in the form of a monolithically integrated circuit.

The overcurrent protection according to an exemplary embodiment of the invention can be utilized in any means of transportation, for example, in an aircraft, a helicopter, an automobile (passenger car, motor truck), a bus, a train or a ship.

BRIEF DESCRIPTION OF THE DRAWINGS

In order to further elucidate and better explain exemplary embodiments of the present invention, exemplary embodiments thereof are described in greater detail below with reference to the enclosed figures. The figures show.

DETAILED DESCRIPTION

Identical or similar components are identified by the same reference symbols in the different figures. The figures are illustrated schematically and not true to scale.

Figure 1:
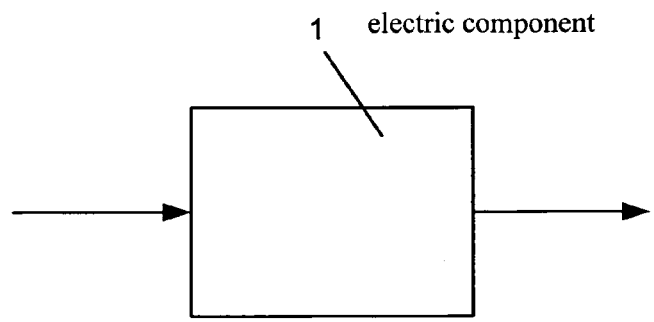
FIG. 1, a schematic representation of an electric device.

FIG. 1 shows an electric component that in the following description represents the weakest link in a circuit, i.e., it represents that particular component of a circuit that should be protected from an overcurrent. For example, Hall sensors of a control unit for heating devices in a passenger aircraft should be effectively protected from being damaged by an overcurrent.

Figure 2:
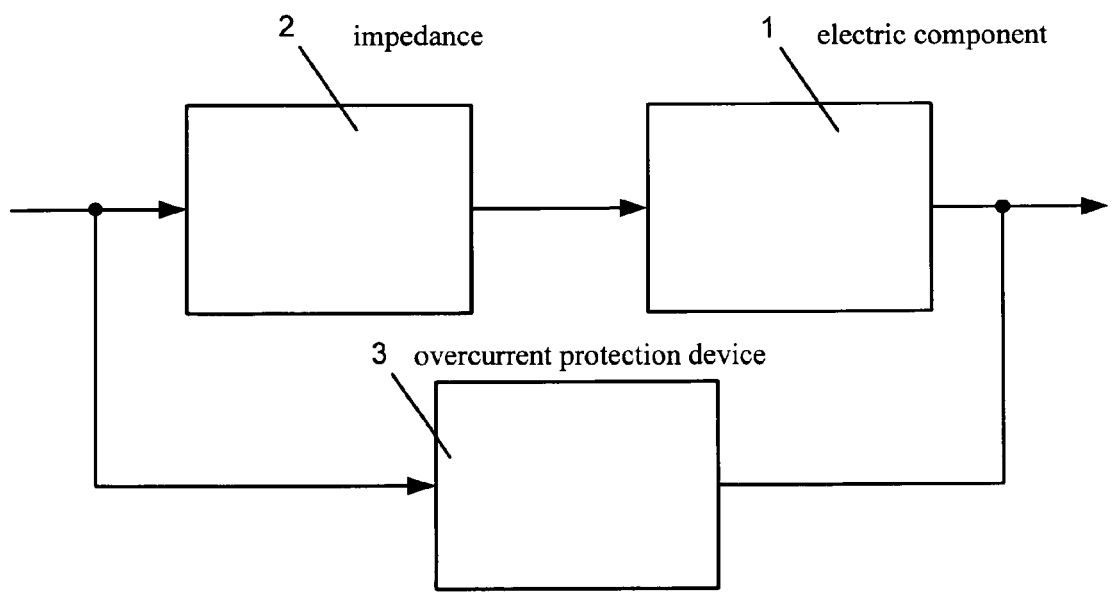
FIG. 2, a schematic representation of an overcurrent protection arrangement according to an exemplary embodiment of the invention.

FIG. 2 shows an overcurrent protection arrangement according to an exemplary embodiment of the invention that is implemented in a passenger aircraft.

An impedance 2 is connected in series upstream of the electric component 1 to be protected, and a safety device 3 or overcurrent protection device is connected in parallel to the elements 1 and 2. A voltage drop caused by a short-circuit can now be used in such a way that the safety device 3 detects the overcurrent and takes over or diverts the current to the parallel branch, in which it is arranged. The limiting voltage at which the safety device 3 diverts the current through the parallel branch needs to be adjusted such that the overcurrent never exceeds the upper limit of the electric component 1. For this purpose, the resistance 2 connected in series to the electric element 1 or the conducting-state voltage and the characteristic curve of the safety device 3 can be adapted accordingly.

For example, the safety device 3 may have such a current/voltage characteristic that, if a sufficiently intense current or a sufficiently high voltage occurs, the resistance of the safety device 3 becomes significantly lower and the respective portion of the current that corresponds to the U/I characteristic is diverted from the branch with the electric component 1 to be protected and transferred or delivered to the current path containing the safety device 3.

The safety device 3 preferably has a symmetric and non-linear U/I characteristic. Due to this non-linear characteristic, it is possible that, if at all, hardly any current flows through the overcurrent protection device 3 under normal operating conditions such that the function of the electronic component 1 is barely impaired, for example, when the electronic component acts as a current measuring device.

Figure 3:
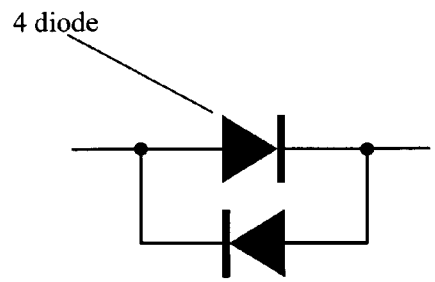
FIG. 3, a schematic representation of an overcurrent protection arrangement according to an exemplary embodiment of the invention in the form of an anti-parallel connection of diodes.

FIG. 3 shows an exemplary embodiment of such an overcurrent protection device 3, in which two anti-parallel diodes 4 are connected in parallel.

In order to reduce the loss caused by the impedance 2, the voltage drop, at which the parallel branch is activated by the safety device 3 in case of a short-circuit, should be chosen as small as possible. In this respect, it is possible to utilize various diodes 4 with different characteristic lines that are particularly well suited for the respective application, for example, silicon, germanium, Schottky, Zener or suppressor diodes. The current intensity is taken over by the respective branches in a certain ratio that corresponds to the specific U/I characteristic of the diodes 4.

Figure 5:
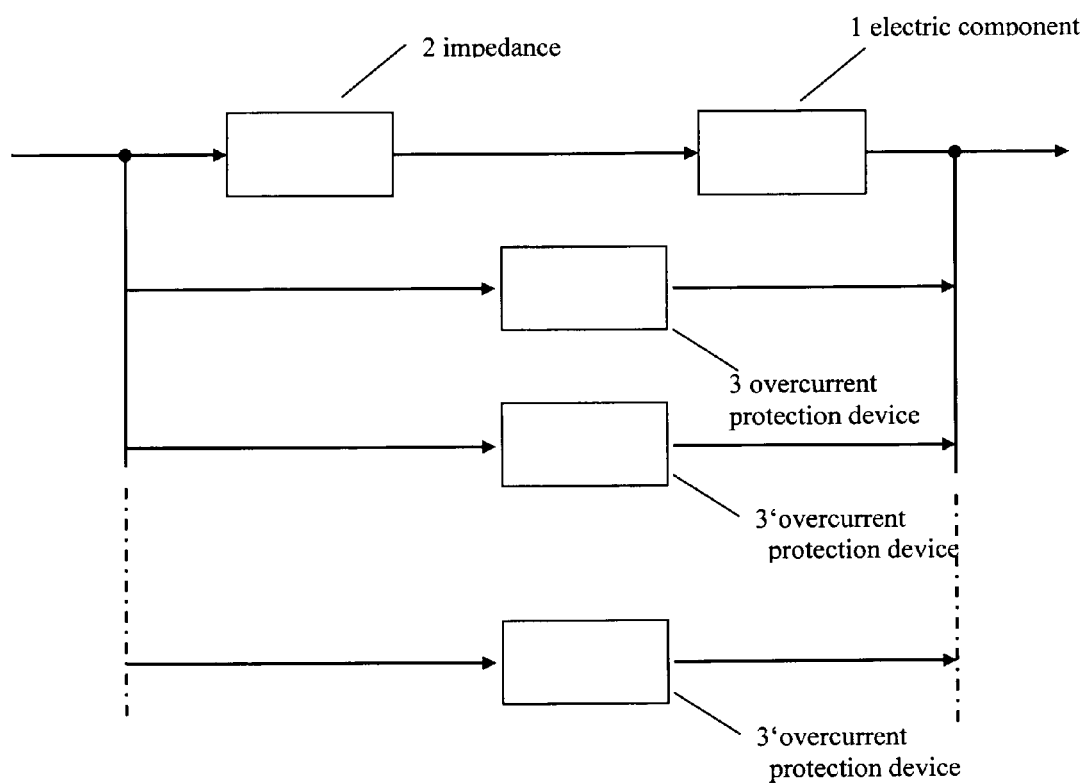

The overcurrent can also be divided and the fault liability can be lowered by connecting several overcurrent protection devices 3' that comprise, for example, an anti-parallel connection of diodes 4 in parallel to the electric component 1 to be protected (see FIG. 5).

Figure 4:
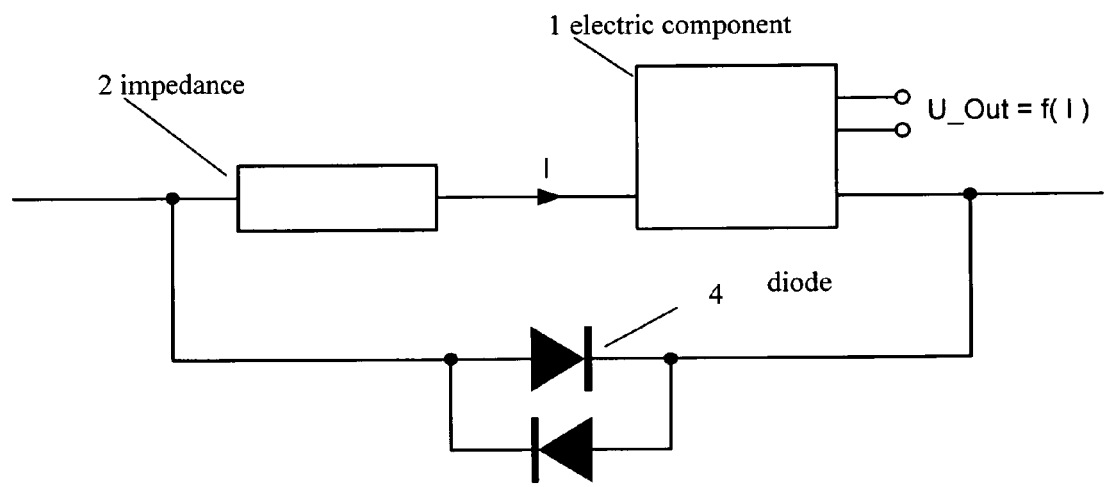
FIG. 4, a schematic representation of an overcurrent protection arrangement according to an exemplary embodiment of the invention, and FIG. 5, a schematic representation of an overcurrent protection arrangement according to an exemplary embodiment of the invention.

The function of the circuit according to the invention is described below in an exemplary fashion with reference to FIG. 4.

The circuit according to the invention can be advantageously utilized in aircraft, among other things, in control units of heating elements. The heating elements are supplied with an A.C. voltage and controlled as well as monitored by control units. The control units are also able to detect defects, for example, a short-circuit occurring in one of the circuits. In order to detect such a defect, the control unit comprises, among other things, a current measuring device comprising a transducer (Hall sensor), for example, as shown in FIG. 4. However, since this transducer frequently proves to be the weakest element or the element most susceptible to failure in case of a short-circuit current in practical applications, a coil is conventionally utilized in this case as mentioned above in order to increase the resistance of the transducer. However, since the voltage drop at the current measuring device is extremely small, it is possible to utilize a resistor with a few $m\Omega$ in order to reach the limiting voltage of the diodes 4 that are connected in parallel.

The circuit arrangement according to the invention (see FIG. 4) provides the advantage of increasing the load limits with respect to an overcurrent for the transducer and consequently for the entire control unit.

The function of the invention can be elucidated with the aid of a numerical example. At a load limit of the current measuring device, a diode 4 is chosen that has a conducting-state voltage of 2 V at 200 A in accordance with its U/I characteristic such that a resistor with 10 mΩ can be chosen at a negligible internal resistance of the current measuring device in order to activate the parallel branch of the circuit arrangement in such a way that the critical current intensity of the element 1 to be protected is not reached. Consequently, the current is divided over the two branches in a relation that corresponds to the U/I characteristic of the diode 4 and, in turn, the load limit of the current measuring device is increased, for example, by a factor of 2. This opens up the possibility of reducing the size of the coil such that the weight and the volume can also be reduced by a factor of 2. Another advantage can be seen in the low loss of the circuit arrangement according to the invention which, at a current intensity of 12 A, merely amounts to 1.4 Watt and therefore is equal to or lower than the loss of the current limiting coil.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An overcurrent protection arrangement for an aircraft to protect an electric element from an overcurrent, the overcurrent protection arrangement comprising:
    an overcurrent protection device,
    at least one additional overcurrent protection device;
    an impedance connected upstream of and in series to the electric element to be protected;
    wherein the overcurrent protection device is designed for detecting the overcurrent of a current by a voltage drop and diverting the current through the electric element via the overcurrent protection device in such a way that the current through the element to be protected does not exceed an upper current limit;
    wherein the overcurrent protection device is connected in parallel to the impedance and the electric element; and
    wherein the at least one additional overcurrent protection device can be connected in parallel to the overcurrent protection device.

2. The overcurrent protection arrangement of claim 1, wherein the overcurrent protection device has a symmetric current/voltage curve.

3. The overcurrent protection arrangement of claim 1, wherein the overcurrent protection device has a non-linear current/voltage characteristic.

4. The overcurrent protection arrangement of claim 1, wherein the overcurrent protection device comprises an antiparallel connection of at least two diodes.

5. The overcurrent protection arrangement of claim 4, wherein the diodes are selected from the group consisting of a silicon diode, a germanium diode, a Schottky diode, a Zener diode, and a suppressor diode.

6. The overcurrent protection arrangement of claim 5, wherein the diodes have different characteristic lines.

7. The overcurrent protection arrangement of claim 5, wherein current intensity is taken over by respective branches in a ratio that corresponds to a specific voltage/current characteristic of the diodes.

8. The overcurrent protection arrangement of claim 1, wherein the impedance is an ohmic resistance.

9. The overcurrent protection arrangement of claim 1, wherein the impedance is a coil.

10. The overcurrent protection arrangement of claim 1, wherein the overcurrent protection device is designed for diverting a current from the electric element to be protected when a predetermined current intensity threshold value is exceeded.

11. The overcurrent protection arrangement of claim 1, wherein the electric component acts as a current measuring device.

12. The overcurrent protection arrangement of claim 1, wherein the impedance can be adapted.

13. The overcurrent protection arrangement of claim 1, wherein a conducting state-voltage and a characteristic curve of the overcurrent protection device can be adapted.

14. The overcurrent protection arrangement of claim 1, wherein the electronic component to be protected is a Hall sensor of a control unit for heating devices.

15. A method of protecting an electric element in an aircraft from an overcurrent, comprising
    detecting the overcurrent of a current by a voltage drop via an overcurrent protection device; diverting a current through the electric element to be protected via the overcurrent protection device in such a way that the current through the element to be protected does not exceed an upper current limit;
    connecting an impedance upstream of and in series to the electric element to be protected;
    connecting the overcurrent protection device in parallel to the impedance and the electric element; and
    connecting at least one additional overcurrent protection device in parallel to the overcurrent protection device.

16. A means of transportation comprising:
    an overcurrent protection device,
    at least one additional overcurrent protection device;
    an impedance connected upstream of and in series to the electric element to be protected;
    wherein the overcurrent protection device is designed for detecting the overcurrent of a current by a voltage drop and diverting the current through the electric element via the overcurrent protection device in such a way that the current through the element to be protected does not exceed an upper current limit,
    wherein the overcurrent protection device is connected in parallel to the impedance and the electric element; and
    wherein the at least one additional overcurrent protection device can be connected in parallel to the overcurrent protection device.

17. The means of transportation of claim 16, wherein the means of transportation is an aircraft.

* * * * *